3,070,551
FURFURYL ALCOHOL BASED IMPREGNATING SOLUTION

Lloyd H. Brown, Crystal Lake, Ill., assignor to The Quaker Oats Company, Chicago, Ill., a corporation of New Jersey
No Drawing. Filed Feb. 12, 1960, Ser. No. 8,227
9 Claims. (Cl. 260—2)

This invention relates to a furfuryl alcohol based, catalyzed solution for impregnating porous and fibrous materials.

It is known that when furfuryl alcohol is mixed with 1-2% by weight of a mineral acid catalyst, a vigorous exothermic reaction occurs and a black, porous, infusible, insoluble resin is formed. Thus the furfuryl alcohol and acid solution has no stability and cannot be stored. Prior art discloses that storage stability is had in an aqueous solution that contains 50% by weight of furfuryl alcohol, at least 35% by weight of furfural and a mineral acid catalyst. However, the relatively high proportion of furfural results in a decreased yield of resinous product having a low alkali resistance.

In U.S. Patent No. 2,909,450 it is claimed that an aqueous solution containing a preponderance of furfuryl alcohol and a catalyst such as certain nitrate salts, zinc chloride, certain dibasic and tribasic organic acids, or salts of strong mineral acids with quinoline, is stable to resinification at room temperature. Since high concentrations of furfuryl alcohol can be used without decreasing the stability at room temperatures, good resin yields are obtained on curing at elevated temperatures. However, the above system has the disadvantage of employing an aqueous medium. The presence of water results in products that are not bubble-free nor smooth. Such resins require additional clean-up work. In addition, the presence of water increases the amount of shrinkage during the curing, since any water present must always be evolved during the cure.

It is an object of this invention to provide a storage-stable, substantially anhydrous solution of catalyst in furfuryl alcohol which is suitable for impregnating porous materials and cures to a resin in high yield at elevated temperatures.

Another object of this invention is to provide a storage-stable, substantially anhydrous solution of catalyst in furfuryl alcohol which upon polymerization will yield a resin that is non-porous and smooth and free from other undesirable effects which would result if an aqueous medium were present.

Still another object of this invention is to provide a storage-stable, resin-forming, substantially anhydrous solution of catalyst in furfuryl alcohol in which high catalyst concentrations are attainable so that there is an extremely rapid cure at 100° C. or higher without a sacrifice in storage-stability at room temperatures.

A further object of this invention is to provide a storage-stable, resin-forming, substantially anhydrous solution of catalyst in furfuryl alcohol which is low in cost as compared to impregnating solutions employed heretofore.

A still further object of this invention is to provide a substantially anhydrous impregnating solution of catalyst in furfuryl alcohol with sufficient stability to withstand the rigorous storage conditions of commercial use.

Still another object of this invention is to provide a substantially anhydrous, furfuryl alcohol based impregnating solution with a sufficiently low viscosity to penetrate a finely porous or fibrous material.

A further object of this invention is to provide a substantially anhydrous furfuryl alcohol based impregnating solution which yields upon curing at an elevated temperature a resin with chemical resistance and improved electrical properties.

In accordance with the invention the above objects are accomplished by a non-aqueous furfuyl alcohol solution of phthalic anhydride. The amount of phthalic anhydride employed is in the range of about 1% to about 20% by weight of the total solution.

It is desirable but not essential to include in the composition of this invention an amount of furfural in the range of about 1% to about 20% by weight of the total solution. The furfural aids in dissolving the phthalic anhydride. It is usually used in such small quantities that it does not affect the yield or the quality of the resin.

It has also been found that the addition of a tertiary amine to the composition of the invention results in an unexpected improvement in storage stability. The tertiary amine is preferably employed in an amount ranging from 0.1 part to 0.5 part by weight in a composition including 80 to 99 parts by weight furfuryl alcohol and 20 parts to about 1 part by weight phthalic anhydride. Any tertiary amine is suitable, e.g. triethylamine, tributylamine, triamylamine, tripropylamine, triethanolamine, etc.

In a specific embodiment of the invention the impregnating solution contains 1 part to about 20 parts by weight phthalic anhydride, an amount of furfural equal to the amount of phthalic anhydride, 60 parts to about 98 parts by weight furfuryl alcohol, and preferably an amount of a tertiary amine (e.g. triamylamine or triethylamine) ranging from about 0.1 part to about 0.5 part by weight.

The invention will be further illustrated but is not limited by the following examples in which the quantities are stated in parts by weight unless otherwise indicated. The term "resin yield" is employed in the examples. This is calculated by dividing the parts by weight of the cured resin obtained by the parts by weight of impregnating solution retained in the material after impregnation and before curing.

Example 1

Ten parts of phthalic anhydride were admixed with 90 parts of furfuryl alcohol. The admixture was allowed to stand for a 24 hour period with occasional stirring at room temperature. By the end of this period the phthalic anhydride was dissolved in the furfuryl alcohol. The solution was allowed to stand for more than one week at room temperature. There was no indication of a chemical reaction. The solution was used to impregnate flake glass paper. The impregnant cured in good yield at 150° C. in 15 minutes.

Example 2

Three parts of phthalic anhydride were dissolved in 3 parts of furfural by heating on a steam bath. The warm solution was then added to 94 parts of furfuryl alcohol. The resulting solution showed little or no change during one month at room temperature or during three days at 50° C. When a sample was heated slowly, it showed an exothermic reaction at about 90° C. Another sample was heated to 89° C. and then removed from the heat. This sample was found to cool normally without evidence of exotherm. A 25 gram sample was heated for 20 hours at 100° C. and cured to a 90% yield of resin. The cured resin was smooth and free of bubbles. By way of comparison a system similar to Example 1 of U.S. Patent No. 2,909,450 was found to be not as stable, giving an exothermic reaction at about 780° C.

Example 3

The procedure of Example 2 was repeated with the exception that, in addition, 0.1 part of triamylamine was added to the furfuryl alcohol. On heating the solution an exothermic reaction began at about 20° higher (° C.)

than with the solution of Example 2. Thus there was further improvement in stability due to inclusion of the tertiary amine. The resin yield was found to be about 87% after curing. Thus the addition of the tertiary amine had little effect on the resin yield obtained as compared to Example 2.

*Example 4*

Twenty parts of phthalic anhydride were dissolved in 20 parts of furfural while heating the latter on a steam bath. This warm solution was then added to 60 parts of furfuryl alcohol along with 0.1 part triamylamine. A half-gallon sample of the resulting solution was heated to 90° C. and removed from the heat. The solution cooled slowly, indicating no substantial exotherm. The solution was used to impregnate porous paper insulation, resinified and cured in about 2 hours at 100° C. The cured resin yield was 46%.

*Example 5*

The procedure in Example 4 was repeated except that 10 parts of phthalic anhydride, 10 parts of furfural and 80 parts of furfuryl alcohol were used. This solution showed an exotherm at about 74° C.

*Example 6*

Samples of furfuryl alcohol with varying proportions of phthalic anhydride, an amount of furfural equal to the amount of phthalic anhydride and a tertiary amine were cured to resins by heating for 17 hours at 100° C., followed by 2 hours at 200° C. The samples, weighing 25 grams each, were placed in 125 milliliter uncovered Ehrlenmeyer flasks. These conditions approximate yields obtainable in impregnating fine porous materials such as wood or carbon. The results were as follows:

| No. of Sample | Percent by wt. Phthalic Anhydride | Percent by wt. Tertiary Amine | Percent Yield |
| --- | --- | --- | --- |
| 1 | 3 | 0.1 triamylamine | 51 |
| 2 | 5 | do | 65 |
| 3 | 10 | do | 73 |
| 4 | 20 | do | 70 |
| 5 | 10 | 0.1 triethylamine | 70 |

The samples containing 10% and 20% phthalic anhydride were hard, while all others were rubbery after 17 hours at 100° C. By way of comparison, a sample made according to Example 1 of U.S. Patent No. 2,909,450 was as rubbery after 17 hours at 100° C. as samples 3, 4 and 5 above were after 2 hours.

Example 6 shows less curing time is required than in U.S. Patent No. 2,909,450. This is possible because of the higher concentration of catalyst that can be used. Examples 4 and 5 show that stability at room temperature is still present despite the higher concentration of catalyst. In addition Example 6 shows that in gaining the above advantages there are resin yields equivalent to those obtained in U.S. Patent No. 2,909,450, namely about 73%.

*Example 7*

Two solutions similar to those in Example 2 were prepared. To one of the solutions was added 0.1 part of triamylamine. Nothing additional was added to the second solution (the control solution). Both solutions were allowed to stand at 50° C. The solution with the triamylamine took 12 days to obtain the same amount of polymerization (25 centipoises viscosity) as the control solution showed after 5 days. Thus the tertiary amine increased the storage stability of the impregnating solution.

*Example 8*

To 72 parts of furfuryl alcohol were added 18 parts of furfural, 5 parts of zinc chloride and 5 parts of water. The resulting solution (the first solution) is the preferred embodiment of U.S. Patent No. 2,909,450. A second solution was prepared in the same manner as in Example 6, Sample No. 3. Both solutions were stored at 50° C. The second solution took 56 hours to obtain the same amount of polymerization (25 centipoises viscosity) as the first solution showed after 35 hours.

*Example 9*

Nineteen parts of furfural and 0.09 part of tributylamine were added to 74 parts of furfuryl alcohol, followed by 7 parts of powdered phthalic anhydride. Solution was obtained in a few minues at room temperature. Twenty-five gram samples of the resulting solution, in open 125-milliliter flasks, were heated for 16 hours at 80° C. and then 2 hours at 217° C. The resin yield was 69.1%.

The composition of this invention, when resinified and cured, produces a resin with improved properties. Since a furfuryl alcohol based solution is employed, the resin has greater chemical resistance, particularly resistance to alkaline reagents. Furthermore, since the furfuryl alcohol solution has a low viscosity, impregnation of porous or fibrous materials results in substantially complete penetration. In addition the use of an organic catalyst as opposed to an inorganic catalyst results in a resin with improved electrical insulating properties.

I claim:

1. A process of preparing a resin from furfuryl alcohol which comprises mixing at substantially room temperature furfuryl alcohol and from 1 to 20 percent by weight of phthalic anhydride and then heating said mixture to a temperature sufficient to polymerize the furfuryl alcohol in the presence of the phthalic anhydride to form a furfuryl alcohol resin.

2. A process of preparing a resin from furfuryl alcohol which comprises mixing at substantially room temperature from about 80 to about 98.9 parts by weight furfuryl alcohol, about 20 parts to about 1 part by weight phthalic anhydride, and about 0.1 part to about 0.5 part by weight of a tertiary amine, and then heating said mixture to a temperature sufficient to polymerize the furfuryl alcohol in the presence of phthalic anhydride and the tertiary amine to form a resin.

3. A process of preparing a resin from furfuryl alcohol which comprises mixing at substantially room temperature from about 60 parts to about 98 parts by weight furfuryl alcohol, from about 1 part to about 20 parts by weight phthalic anhydride, and an amount of furfural equal to said amount of phthalic anhydride, and then heating said mixture to a temperature sufficient to polymerize the furfuryl alcohol to form a resin.

4. A process of impregnating a porous material with a furfuryl alcohol resin which comprises contacting said porous material at substantially room temperature with a liquid mixture comprising furfuryl alcohol and phthalic anhydride, the phthalic anhydride being employed in an amount ranging from about 1 to 20 percent by weight, said liquid mixture being employed in sufficient quantity to permeate the pores of said porous material whereby a quantity of said mixture is retained in said porous material and thereafter heating the impregnated material to a temperature sufficient to form therein a resin.

5. A process of impregnating a porous material with a furfuryl alcohol resin which comprises contacting said porous material with a liquid mixture comprising from about 80 parts to about 98.9 parts by weight furfuryl alcohol, from about 20 parts to about 1 part by weight phthalic anhydride and from about 0.1 part to 0.5 part by weight of a tertiary amine, said liquid mixture being employed in sufficient quantity to permeate the pores of said porous material whereby a quantity of said mixture is retained in said porous material and thereafter heating the impregnated material to a temperature sufficient to form therein a resin.

6. The process of claim 5 wherein the tertiary amine is triethylamine.

7. The process of claim 5 wherein the tertiary amine is tributylamine.

8. The process of claim 5 wherein the tertiary amine is triamylamine.

9. A process of impregnating a porous material with a furfuryl alcohol resin which comprises contacting said porous material with a liquid mixture comprising from about 60 parts to about 98 parts by weight furfuryl alcohol, from about 1 part to about 20 parts by weight phthalic anhydride, and an amount of furfural equal to said amount of phthalic anhydride, said liquid mixture being employed in sufficient quantity to permeate the pores of said porous material whereby a quantity of said mixture is retained in said porous material and thereafter heating the impregnated material to a temperature sufficient to form therein a resin.

References Cited in the file of this patent

UNITED STATES PATENTS

| | | |
|---|---|---|
| 1,989,701 | Lawson | Feb. 5, 1935 |
| 2,319,575 | Agens | May 18, 1943 |
| 2,406,657 | Bitler et al. | Aug. 27, 1946 |
| 2,432,890 | Hersh | Dec. 16, 1947 |
| 2,437,955 | Hersh | Mar. 16, 1948 |
| 2,462,054 | Delmonte | Feb. 22, 1949 |
| 2,909,450 | Goldstein | Oct. 20, 1959 |

FOREIGN PATENTS

| | | |
|---|---|---|
| 549,515 | Great Britain | Nov. 25, 1942 |

UNITED STATES PATENT OFFICE
CERTIFICATE OF CORRECTION

Patent No. 3,070,551            December 25, 1962

Lloyd H. Brown

It is hereby certified that error appears in the above numbered patent requiring correction and that the said Letters Patent should read as corrected below.

Column 2, line 66, for "780° C." read -- 78° C. --.

Signed and sealed this 27th day of August 1963.

(SEAL)
Attest:

ERNEST W. SWIDER
Attesting Officer

DAVID L. LADD
Commissioner of Patents